No. 791,364. PATENTED MAY 30, 1905.
A. PFEIFFER & K. HEIN.
DEVICE FOR SUSPENDING AND SECURING THE SUPPORTING RODS
OF INSTRUMENTS.
APPLICATION FILED NOV. 19, 1903.

2 SHEETS—SHEET 1.

WITNESSES:
A.W. Wright
E.W. Collins

INVENTORS.
Adolf Pfeiffer
Karl Hein
BY Howson and Howson
THEIR ATTORNEYS

No. 791,364. PATENTED MAY 30, 1905.
A. PFEIFFER & K. HEIN.
DEVICE FOR SUSPENDING AND SECURING THE SUPPORTING RODS
OF INSTRUMENTS.
APPLICATION FILED NOV. 19, 1903.
2 SHEETS—SHEET 2.
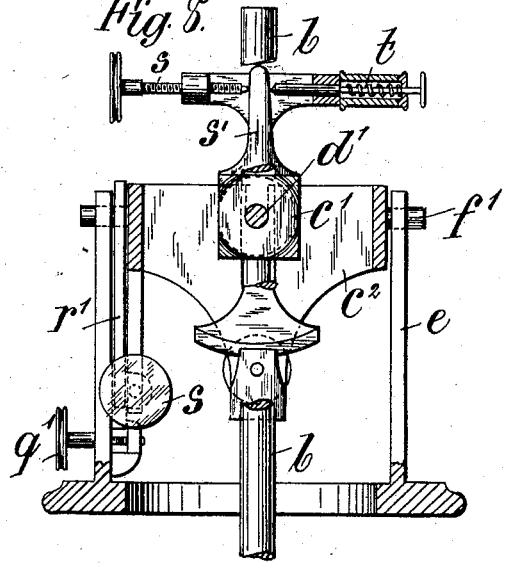
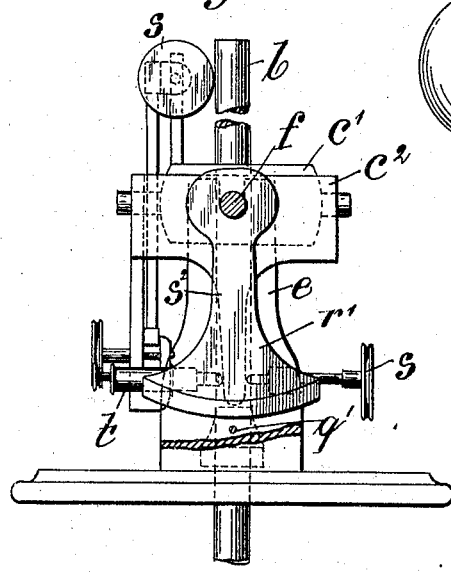
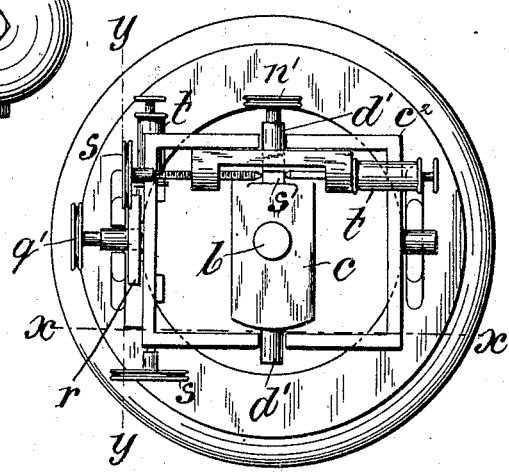
WITNESSES:
F. W. Wright
E. W. Collins
INVENTORS
Adolf Pfeiffer
BY Karl Hein
Howson and Howson
THEIR ATTORNEYS No. 791,364.

Patented May 30, 1905.

UNITED STATES PATENT OFFICE.

ADOLF PFEIFFER AND KARL HEIN, OF HANOVER, GERMANY; SAID PFEIFFER ASSIGNOR TO SAID HEIN.

DEVICE FOR SUSPENDING AND SECURING THE SUPPORTING-RODS OF INSTRUMENTS.

SPECIFICATION forming part of Letters Patent No. 791,364, dated May 30, 1905.

Application filed November 19, 1903. Serial No. 181,884.

*To all whom it may concern:*

Be it known that we, ADOLF PFEIFFER and KARL HEIN, subjects of the German Emperor, and residents of Hanover, in the German Empire, have invented a Device for Suspending and Securing the Supporting-Rods of Instruments, of which the following is a specification.

The Cardanic suspension would prove a satisfactory perpendicular adjusting means for the supporting-rods of instruments if it were not that it fails where the supporting-rod has to be adjusted for a length of time. For this reason the Cardanic suspension is entirely useless for many purposes—for instance, for the horizontal maintenance of geodetic instruments and many other apparatus, in which a continued vertical adjustment of the supporting-rod and a continued horizontal position of the instruments connected with the rod are required. For this reason in geodetic instruments suspension arrangements in which the supporting-rod swings in all directions are not in use, and those in which it swings only on a plane are but little in use.

This invention has for its object to effect by simple means such adjustment, so that the supporting-rod may be kept in the position of rest for any desired length of time. Such a construction may consist—for instance, like a Cardanic suspension—of a frame movable in a plane by means of two cylindrical pins in a bearing, in which frame the supporting-rod of the instrument is suspended vertically to the pins of the frame and moves in a plane at right angles to the first.

Figure 1:
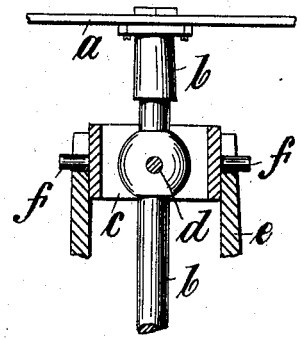
Figure 2:
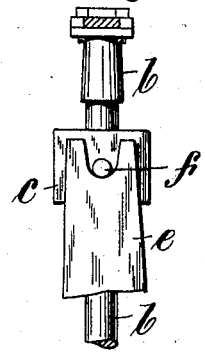
Figure 3:
Figure 4:
Figure 5:
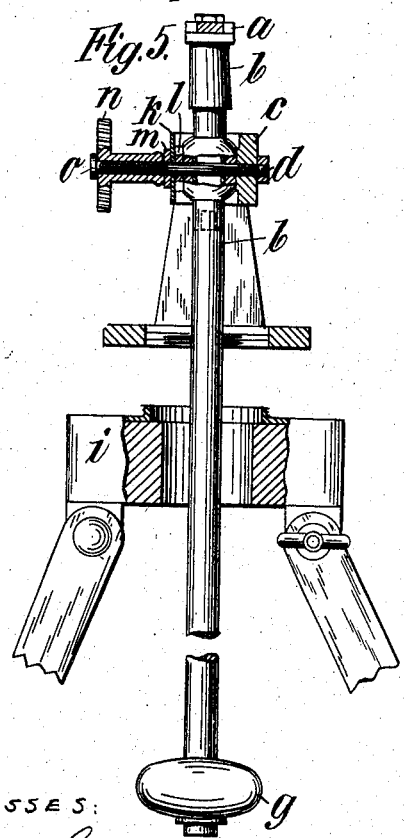
Figure 6:
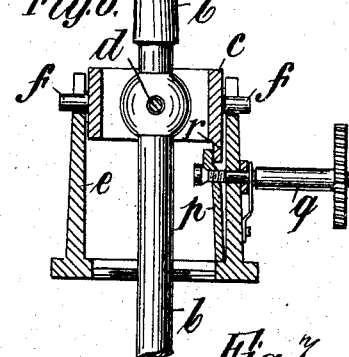
Figure 7:
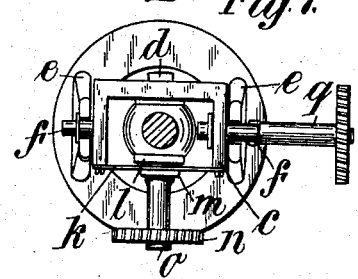

In the accompanying drawings, Figure 1 shows a longitudinal section through the universal joint, and Fig. 2 is a front view. Figs. 3 and 4 show two different ways of securing universal-joint pins. Fig. 5 shows a vertical cross-section. Fig. 6 is a vertical longitudinal section, and Fig. 7 is a plan view, of one form of our invention. Fig. 8 shows a vertical longitudinal section along the line $x\,x$ of Fig. 10. Fig. 9 is a section along $y\,y$ of Fig. 10, and Fig. 10 is a plan view of a modified form of our invention.

The rule $a$ rests on the supporting-rod $b$, which according to the examples of Figs. 1 to 7 oscillates on the horizontal shaft $d$, fastened in the bearing-frame $c$, while the supporting-rod may advantageously be composed of two parts, which for the purpose of taking apart and of easy transportation are connected with each other. The second axis of oscillation is at right angles to the shaft $d$ and is formed of the pin $f$ of the frame $c$, resting in the bearing $e$, so that the supporting-rod $b$ is movable in the manner of the universal joint, so that by means of the pendulum-weight $g$ it is brought automatically to the vertical. Accordingly the rule $a$ with ever so oblique a position of the tripod is caused to assume a horizontal position.

In order that the joint may come quickly to rest and not, like the ordinary Cardanic suspension, remain a long time in motion or be set in motion again by slight concussions, the frame $c$, Fig. 1, provided with the joint-pin $f$, is snugly fitted into the bearing $e$ in such manner that between the front sides of the swinging frame $c$ and the surfaces of the stationary bearing $e$ so much friction exists that superfluous oscillations of the frame $c$ are avoided. This friction, however, is not so great that it might disturb the nicety of the adjustment. The supporting-rod $b$ is snugly guided in like manner in the sides of the frame $c$. Besides this arrangement or in place of the same the bearing-notches, Fig. 2, for the joint-pins $f$ in the bearing $e$ are made somewhat larger than the diameters of these pins $f$, which thus in their motion get the tendency to roll in the larger bearing-notches. This tendency of the pins is counteracted, however, by the weight resting on the pins, which weight during the rolling of the pins would have to be raised on the ascending course of the bearing-notches. The shaft $d$ is made conical, Fig. 5, and is fitted accurately into the supporting-rod $b$ in such manner that this shaft $d$ can be readjusted to compensate for wear. The supporting-rod $b$ is advantageously made hollow in order that the friction of the shaft $d$ may equal as much as possible the friction of the pins $f$. The joint-pins may also, in order to attain the before-mentioned object, be braked by any other desired contrivance which is so formed that its brake action can be increased up to the tight clamping of the joint in order to tightly fix the joint when in exact horizontal position. This object may be served, as shown in Fig. 3, by a simple screw $q^2$ pressing against the pin $f$ by means of clamping-piece $r^2$, or, again, a clamping-ring $r^3$ may be used, which can be pressed together by screw $q^3$, Fig. 4. Another example of a means for tightly clamping the joint is shown in Figs. 5 to 7. The side $k$ of the bearing-frame $c$ is springy and advantageously has a clamp-disk $l\ m$ on each side. Against the outer disk $m$ there rests the shaft of a clamp-screw $n$, screwed onto the extended shaft $d$, which clamp-screw in one direction of revolution presses the disks $l\ m$ against an enlarged part on the supporting-rod $b$, so that the latter is tightly clamped, while with a contrary turn of the screw limited by the stop $o$ the clamp-disk $l$ is caused by the spring $k$ to draw back in order to permit the oscillation of the instrument on the axle $d$. A quarter to half a revolution of the screw $n$ is sufficient as a rule to effect the clamping or loosening.

For adjusting tightly the pins $f$ there may be provided a clamping-plate $p$, which by means of the thread on the clamping-screw $q$ may be pressed against or drawn away from the surface of a depending lug $r$ of the frame $o$. A like arrangement may also be placed on the opposite side in the bearing $e$, if desired.

As the clamping-surfaces, plate $p$, and disk $l$ on moving against the clamping-surfaces of the frame $c$ or the supporting-rod $b$ are guided exactly parallel to the axes $f$ or $d$, (the tight adjustment of which they are to effect,) the position of the rule remains undisturbed by the clamping-screws being turned, which would not be the case if the clamping-surfaces were turned away with respect to each other or if the axes themselves oscillated.

For the pendulum-weight the instrument itself may be substituted and placed with its center of gravity below the suspension contrivance, so that it represents a pendulum-weight, as it were, and effects the automatic adjustment in the manner hereinbefore described. In some cases the automatic adjustment may be dispensed with and the same means employed for a hand-adjusted instrument.

Figs. 8 to 10 show a way of carrying out the invention for the subsequent exact adjustment of the instrument after the tight clamping, no matter whether the first adjustment has been effected automatically by a pendulum or by hand, for it is possible that with a premature adjustment or one undertaken during concussions the adjusted instrument will not lie entirely horizontal. Such deviations are to be corrected by micrometer-screws. For this purpose the supporting-rod $b$ for the instrument is solidly connected with the part $c'$, which rests by the pins $d'$ in a frame $c^2$, the pins $f'$ of which rest in the bearing-blocks $e$. The parts $m'$ and $r'$ are tightly clamped by the clamp-screws $n'$ and $q'$ to secure the two axes of oscillation and are provided each with a micrometer-screw $s$, which rests against a projection $s'$ or $s^2$ of each frame $c'$ or $c^2$. Against the opposite side of each arm $s'$ or $s^2$ there rests a spring $t$, so that each frame is held by its projection tightly between the spring $t$ and the micrometer-screw $s$. If after clamping the two parts $m'$ and $r'$ the instrument is found to be not horizontal, the screws $s$ may be adjusted to correct such error as may exist. It is obvious that this adjusting can be attained not only at the joint portions of the suspension, as shown, but it may also be accomplished by clamping the supporting-rod itself.

We claim as our invention—

1. A supporting-rod for instruments, having two axes of oscillation at right angles to each other and a frame and bearing in which said axes lie, in combination with means for clamping the rod, consisting of screws and clamping-surfaces parallel to the parts to be clamped, substantially as described.

2. A supporting-rod for instruments, having means for oscillating in two directions, means for clamping the rod against such motion, and adjusting means adapted to displace the rod subsequent to its clamping.

3. A supporting-rod for instruments, having a pivotal frame for the rod and a pivotal bearing for the frame, means for clamping both against turning, and projections on the frame and bearings and micrometer-screws and springs to adjust the position of the frame and bearing subsequent to the clamping, substantially as described.

4. A supporting-rod for instruments, having a pivotal frame for the rod, a pivotal bearing for the frame, a projection for each, pivotally-mounted parts $m'$, $r'$ carrying micrometer-screws, to bear against said projections, and means for clamping said parts against movement, substantially as described.

5. A supporting-rod pivotally mounted in a frame, a projection $s'$ for the rod, a part $m'$ pivotally mounted on the axis of the rod and a clamping means on the frame to prevent the oscillation of the parts $m'$ on said axis, and micrometer adjusting means carried by said part, in combination with a pivotal bearing for said frame and projecting part, clamping means and micrometer means to control oscillation of the pivotal bearing in substantially the manner hereinabove described.

In testimony whereof we have signed our names to this specification in the presence of two subscribing witnesses.

ADOLF PFEIFFER.
KARL HEIN.

Witnesses:
H. HALL HALL,
ANNA DIPPEL.